(12) United States Patent
Anilkumar et al.

(10) Patent No.: US 8,150,602 B2
(45) Date of Patent: Apr. 3, 2012

(54) METHOD AND SYSTEM FOR ESTIMATING IN-CYLINDER PRESSURE AND KNOCKING UTILIZING AN IN-CYLINDER PRESSURE SENSOR

(75) Inventors: Ramsesh Anilkumar, Karanataka (IN); Baburaj K. P., Karnataka (IN); Palani Thanigachalam, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 1181 days.

(21) Appl. No.: 11/983,263

(22) Filed: Nov. 8, 2007

(65) Prior Publication Data
US 2009/0120164 A1    May 14, 2009

(51) Int. Cl.
*G06F 19/00* (2006.01)
(52) U.S. Cl. .................. 701/110; 123/435; 123/406.29; 123/406.41
(58) Field of Classification Search .................. 701/101, 701/110, 114, 115; 123/434, 435, 673, 406.29, 123/406.33, 406.37, 406.38, 406.39, 406.41
See application file for complete search history.

(56) References Cited

U.S. PATENT DOCUMENTS

| | | | |
|---|---|---|---|
| 4,450,709 A | 5/1984 | Hayashi | 73/35 |
| 4,455,862 A | 6/1984 | Takeuchi | 73/35 |
| 4,552,111 A | 11/1985 | Tahara | 123/425 |
| 5,594,649 A | 1/1997 | Cook et al. | 364/424.034 |
| 7,021,287 B2 * | 4/2006 | Zhu et al. | 123/435 |
| 7,181,339 B2 | 2/2007 | Remelman | 701/111 |
| 7,472,687 B2 * | 1/2009 | Zhu et al. | 123/406.34 |
| 7,690,352 B2 * | 4/2010 | Zhu et al. | 123/406.14 |
| 7,798,124 B2 * | 9/2010 | Barrett et al. | 123/406.37 |
| 2005/0022582 A1 | 2/2005 | Barron et al. | 73/35.01 |
| 2006/0117834 A1 | 6/2006 | Goto | 73/35.09 |
| 2006/0137648 A1 | 6/2006 | Nakashima et al. | 123/299 |
| 2006/0241831 A1 | 10/2006 | Watanabe et al. | 701/29 |
| 2006/0243030 A1 | 11/2006 | Oe et al. | 73/35.09 |
| 2007/0028893 A1 | 2/2007 | Hernandez | 123/406.16 |
| 2007/0175268 A1 | 8/2007 | Honda | 73/35.04 |
| 2007/0179756 A1 | 8/2007 | Honda | 702/190 |
| 2007/0209424 A1 | 9/2007 | Monroy et al. | 73/35.11 |

* cited by examiner

*Primary Examiner* — John Kwon
(74) *Attorney, Agent, or Firm* — Seager, Tufte & Wickhem LLC

(57) ABSTRACT

A system for measuring in-cylinder parameters utilizing an image charge measured in an engine cylinder by an in-cylinder pressure sensor due to chemi and or thermal ionization in Engine. The in-cylinder pressure sensor includes a sensing element, which is a metal sensor probe with a selective coating (e.g., metal, oxides of metal, native oxides, semiconductor, oxides of semiconductors, ceramics, glass, dielectric, etc., in the form of a coating on the metallic probe, tube, etc) in order to function in harsh, corrosive and/or elevated temperature environments. The output of the sensor can be connected to a signal-conditioning unit, which includes a low noise differential charge amplifier with an auto offset correction circuit to measure fast varying signals. The signal out from the conditioning unit can be acquired utilizing a high-speed microcontroller-based data acquisition system with suitable software to analyze and estimate parameters such as, for example, in cylinder pressure and knocking.

20 Claims, 12 Drawing Sheets

METHOD AND SYSTEM FOR ESTIMATING IN-CYLINDER PRESSURE AND KNOCKING UTILIZING AN IN-CYLINDER PRESSURE SENSOR

TECHNICAL FIELD

Embodiments are generally related to pressure sensors. Embodiments are also related to in-cylinder pressures sensors. Embodiments are additionally related to a methods and systems for estimating in-cylinder pressure and engine knocking.

BACKGROUND OF THE INVENTION

Increasing emission standards demands for reduced hazardous exhaust gas emissions and improved fuel economy for automobile engines. Engine performance and its emission generally depend on various parameters, such as, for example, air-fuel ratio, engine pressure, combustion temperature, EGR (Exhaust Gas Recirculation) circulation and ignition timing. Vehicles can include an internal combustion engine that generates drive torque to drive wheels. More specifically, the engine draws in air and mixes the air with fuel to form combustion mixture. The combustion mixture is compressed within cylinders so that the mixture gets combusted in order to drive pistons that are slidably disposed within respective cylinders. The pistons rotatably drive a crankshaft to transfer drive torque to a driveline and ultimately to the wheels. The engine performance can be controlled by measuring various parameters inside the cylinders like pressure, temperature, inside the cylinder, efficiency of combustion and its by-products.

The use of real time cylinder pressure information in advanced diesel engine monitoring and control techniques offer the potential for improved engine reliability and performance as well as reduced levels of emissions. The information on actual pressure developing inside the cylinder can be utilized to control the engine performance, emission control and reduce knocking of the engine. Hence it requires detailed and specified knowledge of the combustion process inside the engine cylinder along with a sophisticated technique in engine diagnostics and control. In recent years, several new sensor technologies have been developed and implemented due to increasing requirements for improved engine performance. A sensor, which is mounted on the engine, needs to possess a very high response time, which requires the measurement of the actual pressure. The engine "knocking" (i.e., auto-ignition and severe pressure pulse is generated in the engine) can be estimated if the transient cylinder pressure is measured. The frequency of knocking signal is a function of cylinder dimension, temperature and which is well know. It is in the order of 5 kHz.

The majority of prior art sensors utilize a piezo-electric element that detects the rate of change of in-cylinder pressure. In general, when the piezo-electric element is used, there are hysteresis characteristics in a relationship between a change in the actual in-cylinder pressure and an output of the in-cylinder pressure sensor. Furthermore, the output of the in-cylinder pressure sensor increases as the temperature of the piezo-electric element increases. When such an in-cylinder pressure sensor is mounted on the engine, variations occur in the output of the in-cylinder pressure sensor due to the heat generation from the engine. They are subject to electromagnetic interference (EMI) effects, have limited lifetime, and are unacceptably expensive.

Similarly lower cost piezoceramic devices, such as spark plug washers and boss-type sensors, do not offer high accuracy under all engine conditions, are subject to electrical interference problems, and are prone to large temperature errors. The degrading effect of alloy segregation, selective oxidation, and diffusion reduces the durability of these sensors and is not sufficient for use in production engines. Similarly, these sensors have limitation in working continuously at very high temperature of about 1000° C.

Another prior art sensor utilizes ionization current signal detection in which a spark plug is used as a sensing probe, to measure the in-cylinder pressure for controlling the performance and emissions of an automobile engine. The ions are generated during combustion and the in cylinder pressure is function of the ion characteristics like magnitude, decay time, etc. The ion current measurement to measure the ionization needs a high voltage source and it is quite complicated and expensive.

FIG. 1 illustrates a prior art graph 10 depicting pressure variation inside engine cylinder versus crank angle. As shown in graph 10 the actual pressure inside the cylinder can be measured and utilized to control the engine performance, emission control and reduce knocking of the engine.

FIG. 2 illustrates a prior art graph 20 depicting pressure variation during engine knocking. The engine cylinder pressure development and its qualified evaluation can be recorded for optimizing activities that are associated with the thermodynamics of power cycle of combustion engine. These results can provide basic information regarding factors such as, for example, engine cylinder pressure development and simulation calculations of theoretical pressure and temperature developments in the cylinder of individual engines can be carried out. The pressure variation during engine knocking, for example, can be measured and utilized to control the knocking via an electronics control unit.

Based on the foregoing it is believed that a need exists for an improved in-cylinder pressure sensor for measuring in-cylinder parameters under very high pressure, high temperature and harsh conditions. It is believed that by utilizing a low cost in-cylinder pressure sensor described in greater detail herein, the engine parameters can potentially be estimated from the measured charge.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved in-cylinder pressure sensor.

It is another aspect of the present invention to provide for improved methods and systems for the accurate estimation of in-cylinder parameters such as, for example, pressure and knocking.

The aforementioned aspects and other objectives and advantages can now be achieved as described herein. A system and method for measuring in-cylinder parameters utilizing an image charge technology, to measure a charge concentration in an engine cylinder by an image charge in-cylinder pressure sensor is disclosed. The in-cylinder pressure sensor includes a sensing element, which is an electrode with or without a selective coating in order to work in harsh, corrosive and elevated temperature. The output of the sensor can be connected to a signal-conditioning unit, which includes a low noise differential charge amplifier with an auto offset correction circuit in order to measure fast varying signals. The signal out from the conditioning unit can be acquired in a high-speed microcontroller based data acquisition system with suitable software to analyze and estimate parameters such as, for example, in cylinder pressure and knocking.

The input stage of the signal-conditioning unit includes a pair of charge amplifiers connected to the output of the in-cylinder pressure sensor by means of a twisted and or untwisted two pair cable with grounded shield. The output from the charge amplifiers can be directed to a differential amplifier in order to provide an amplified sensor signal without noise signal. The differential amplifier and the charge amplifiers include an auto offset correction circuit to reduce error due to offsets. The gases and particulates inside the cylinder gets ionized during combustion due to thermal and or Chemi ionization and the ionized charge can be measured in the engine cylinder by the electrodes utilizing image charge technology and estimated parameters indicative of, for example, in-cylinder pressure and knocking. The in-cylinder pressure sensor can be mounted along with the engine cylinder and data can be acquired utilizing the data acquisition system described herein. The improved system and method described herein can be utilized to measure ions (i.e., charge generated in the cylinder during combustion utilizing image charge technique).

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 3:
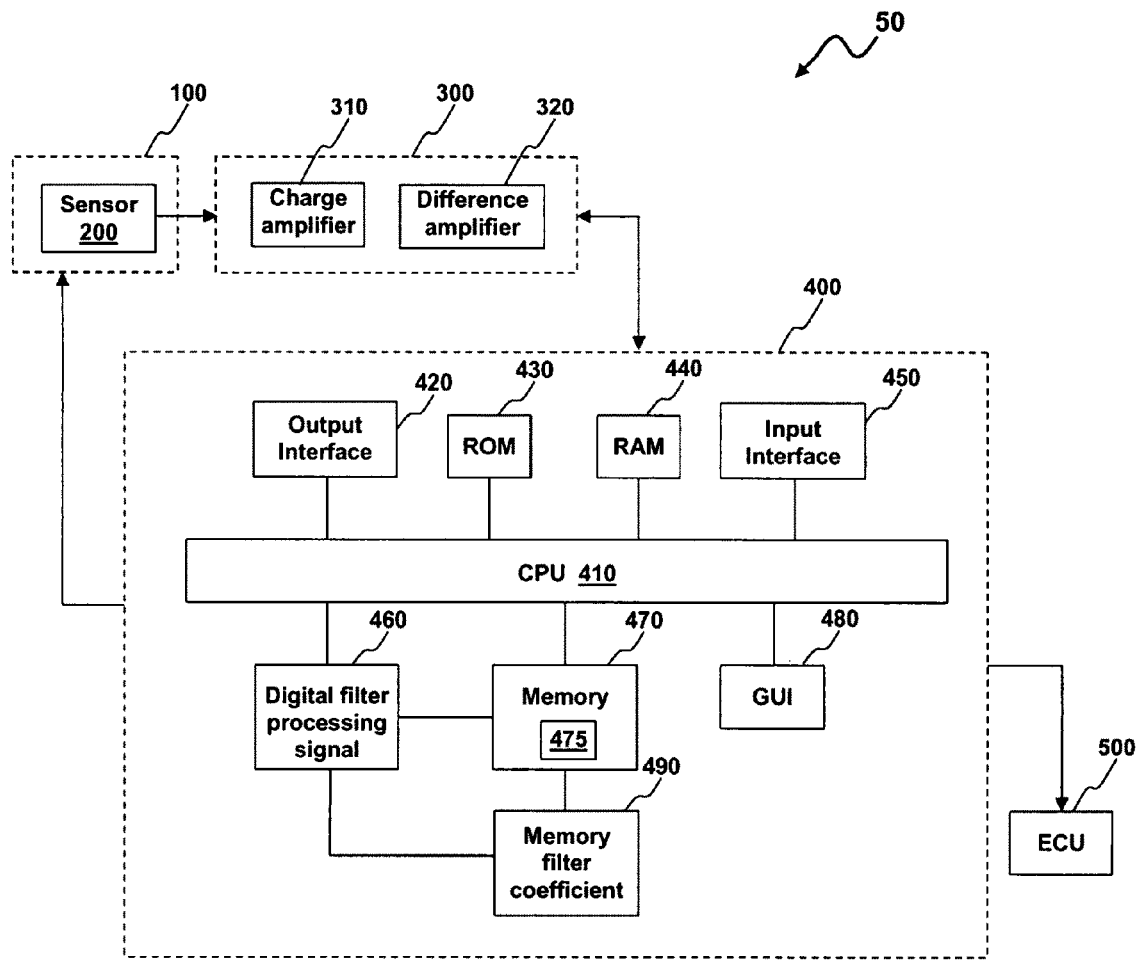
FIG. 3 illustrates a block diagram representation of an in-cylinder pressure sensor and a data acquisition system for analyzing and estimating in-cylinder parameters, in accordance with a preferred embodiment.

Referring to FIG. 3 a block diagram representation 50 of an in-cylinder pressure sensor 200 and a data acquisition system 400 for analyzing and estimating in-cylinder parameters is illustrated, in accordance with a preferred embodiment. The in-cylinder pressure sensor 200 can be mounted on an engine cylinder 100 and the output from the sensor 200 can be electrically connected to a signal conditioning unit 300. A data acquisition system 400 receives signals from the signal-conditioning unit 300 and processes the signals in accordance with engine combustion pressure using image charge sensing principles. The signal conditioning unit 300 includes a charge amplifier 310 and a differential amplifier 320. The differential amplifier 320 subtracts the signals from the charge amplifier 310.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Figure 1:
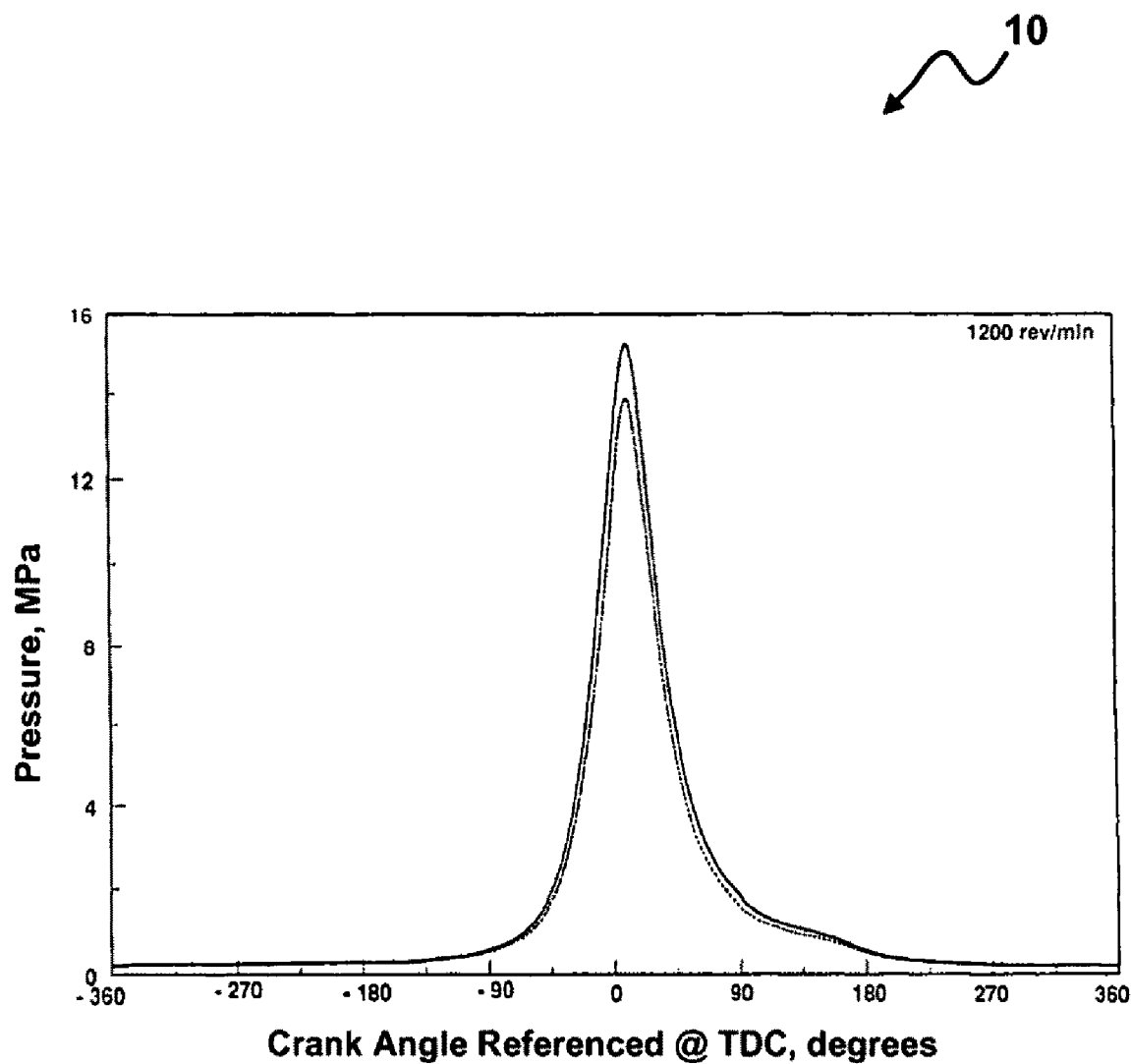
FIG. 1 illustrates a prior art graph depicting pressure variation inside engine cylinder versus crank angle.
Figure 2:
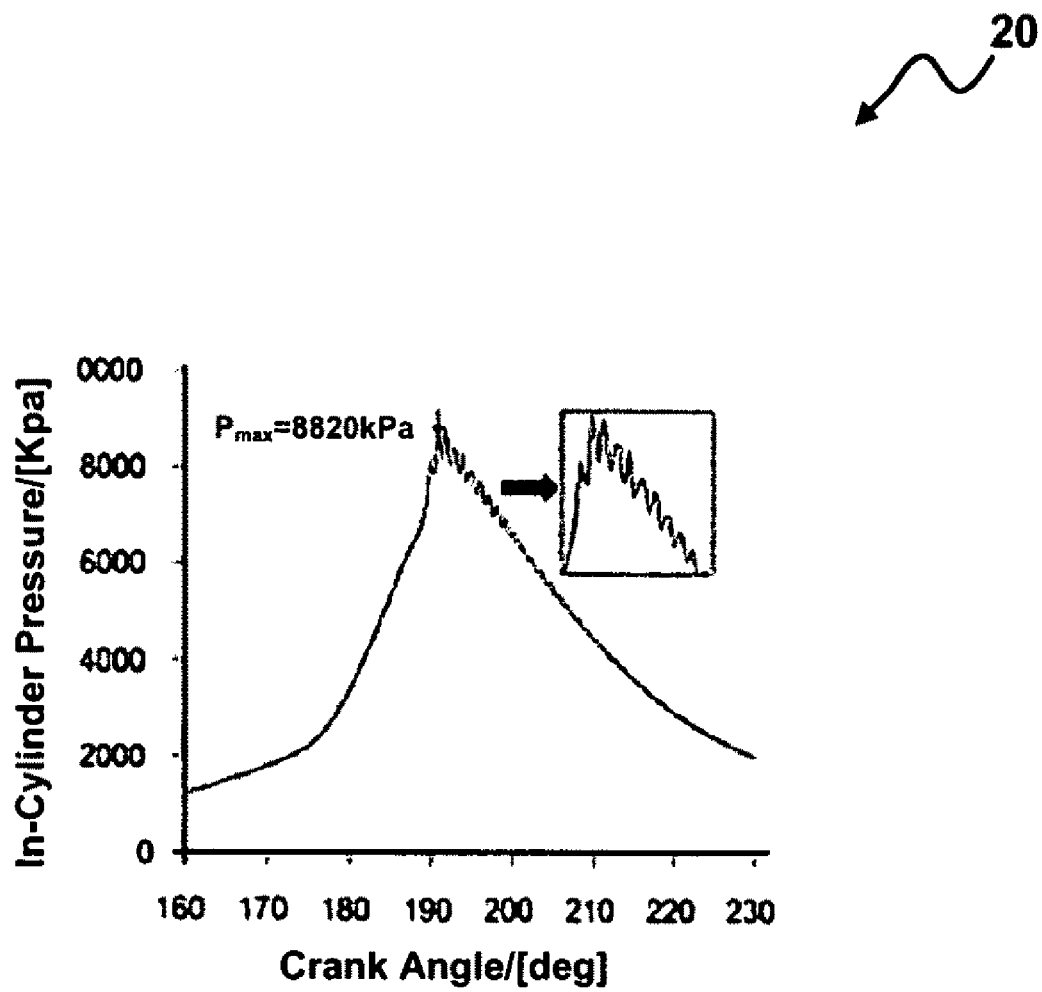
FIG. 2 illustrates a prior art graph depicting pressure variation during engine knocking.

Software modules generally can include instruction media storable within a memory location of an image processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 475 depicted in FIG. 1.

The data acquisition system 400 is essentially a computer and comprises an input interface 450 for receiving data sent from the signal conditioning unit 300, a CPU 410 for carrying out operation for controlling each part of the vehicle, a memory 470 including a read only memory (ROM) 430 and a random access memory (RAM) 440, and an output interface 420 for sending a control signal to the engine cylinder 100. Memory 470 can be implemented as a ROM, RAM, a combination thereof, or simply a general memory unit. Module 475 can be stored within memory 470 and then retrieved and processed via processor 410 to perform a particular task. The input interface 450, such as a keyboard, mouse, or another pointing device, can be connected to CPU 410.

One or more programs and data for controlling each part of the vehicle are stored in the ROM 430. The ROM 430 may be a rewritable ROM such as an EPROM. The RAM 440 provides work areas for operation by the CPU 410, in which data sent from signal conditioning unit 300 as well as a control signal to be sent out to each part of the vehicle are temporarily stored. The input interface 450 converts an analog signal value into a digital signal value. The CPU 410 processes the resulting digital signal in accordance with a program stored in the memory 470 as a module 475, and creates a control signal. The output interface 420 sends the control signal to an in-cylinder pressure detecting sensor 200. The output interface 420 functions as a display (e.g., a video monitor) for displaying data and information for a user and also for interactively displaying a graphical user interface (GUI) 480.

Note that the term "GUI" generally refers to a type of environment that represents programs, files, options and so forth by means of graphically displayed icons, menus, and dialog boxes on a computer monitor screen. A user can interact with the GUI 480 to select and activate such options by pointing and clicking with a user input device such as, for example, a pointing device such as a mouse, and/or with a keyboard. A particular item can function in the same manner to the user in all applications because the GUI 480 provides standard software routines (e.g., module 111) to handle these elements and reports the user's actions. The functions of the blocks are typically implemented by one or more computer programs stored in the memory 470 as a module 475. Alternatively, these functions may be implemented by software, hardware and firmware or any combination thereof.

The data acquisition system 400 further includes a digital filter 460 for performing digital filter processing, for successively storing processing results that are obtained by the digital filter 460 using memory filter coefficient 490 in the memory 470. Once in every 10 microseconds, derived filter processing results are stored in the memory 470. These filter processing results may be stored unchanged in the memory 470. However it can be equally possible to perform data compression of these before storing in the memory 470. These cylinder pressure signals can be fed to the engine control unit (ECU) 500, which can control the engine with respect to a desired driving condition.

Figure 4:
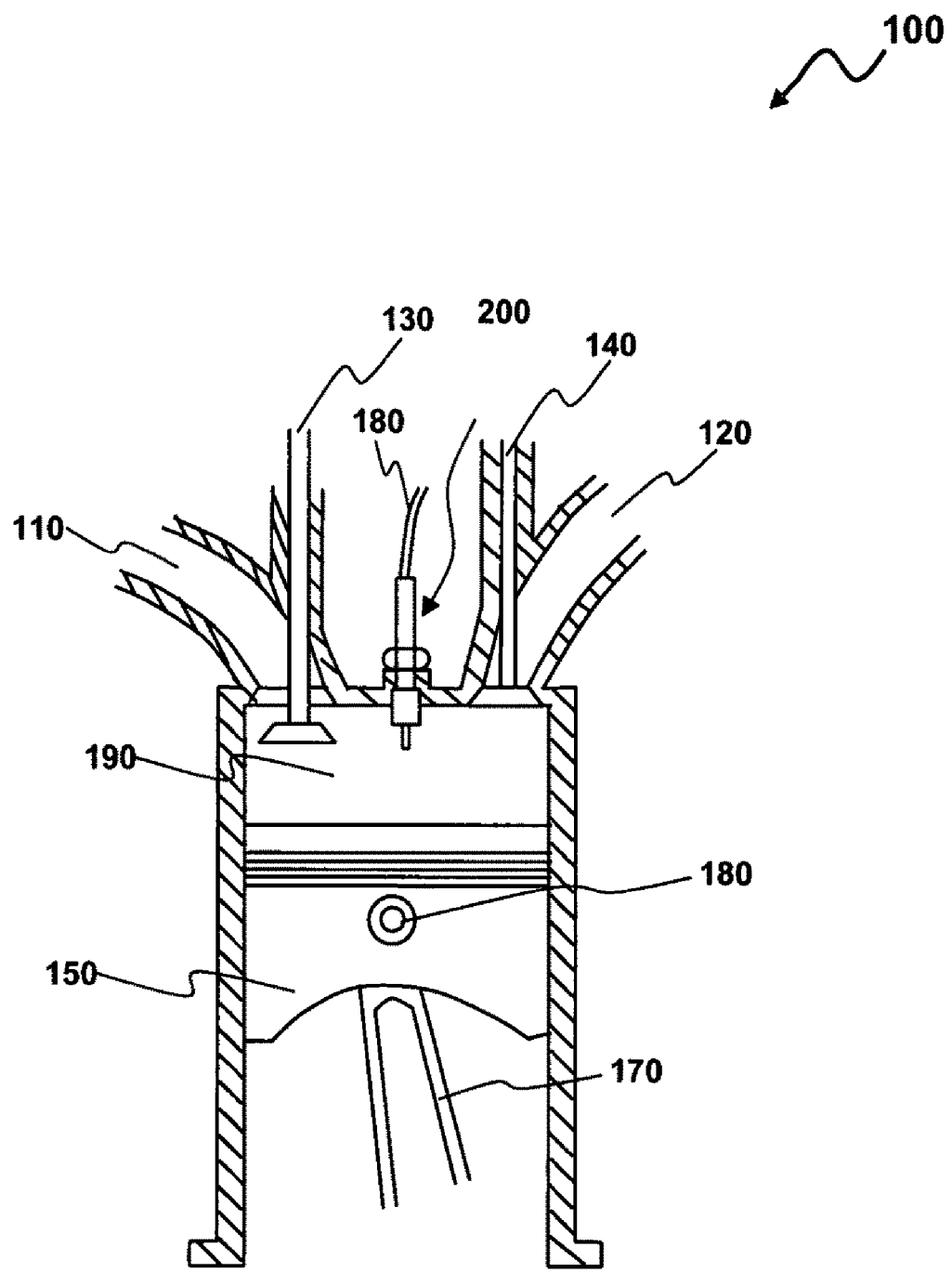
FIG. 4 illustrates a perspective view of an engine cylinder with the in-cylinder pressure sensor, which can be implemented in accordance with a preferred embodiment.

Referring to FIG. 4, a perspective view of an engine cylinder 100 with the in-cylinder pressure sensor 200 is illustrated, which can be implemented in accordance with a preferred embodiment. Note that in FIGS. 3-12, identical or similar parts or elements are generally indicated by identical reference numerals. The engine cylinder 100 is, for example, a 4-cycle engine. The engine cylinder 100 can comprise a variable compression ratio mechanism. The engine cylinder 100 can be connected to an intake manifold 110 through an air intake valve 130 and connected to an exhaust manifold 120 through an exhaust valve 140. The intake valve 130 and the exhaust valve 140 can be driven by a continuously variable valve driving system. The intake valve 130 receives an air fuel in case of a petrol engine configuration, or an air and a fuel mixture in a diesel internal combustion engine configuration, into a combustion chamber 190. An exhaust manifold 120 is also provided and operable to enable flow of exhaust out of the combustion chamber 190. The combustion chamber 190 is of a cylindrical configuration and receives a cylindrical piston 150 to linearly reciprocate therein. The piston 150 can be connected to the connecting rod 170 by a piston pin 180, for high speed four-stroke cycle internal combustion engines. The engine piston 150 transmits the force generated by the combustion gas to the connecting rod 170. The connecting rod 170 is the joining element between engine piston 150 and a crankshaft (not shown). The connecting rod 170 is subjected to extreme tensile, compression and flex stresses and the length of the connecting rod 170 can be determined by the piston stroke.

Figure 5:
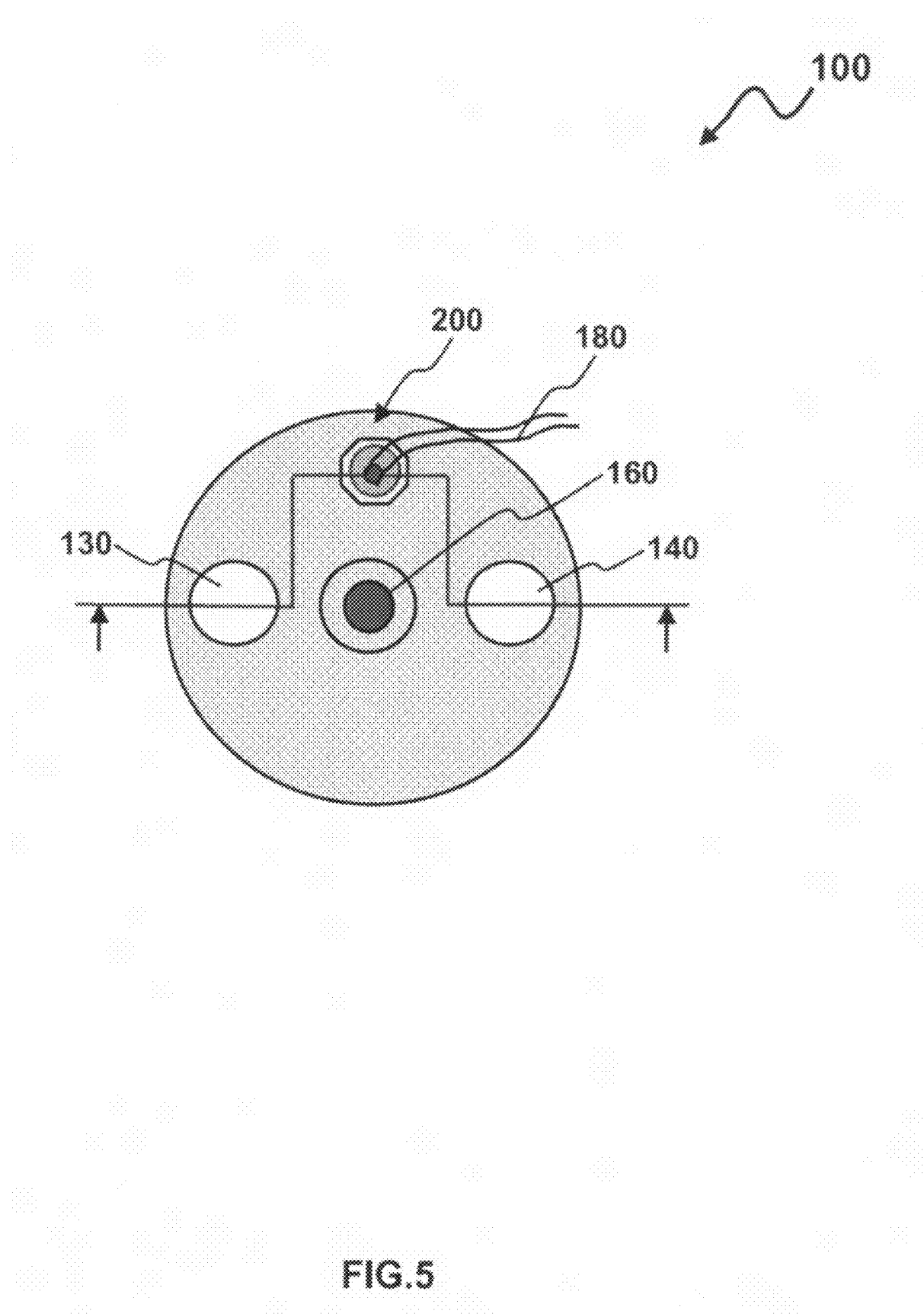
FIG. 5 illustrates a top view of the engine cylinder with the in-cylinder pressure sensor, which can be implemented in accordance with a preferred embodiment.

Referring to FIG. 5 a top view of the engine cylinder 100 with the in-cylinder pressure sensor 200 is illustrated, which can be implemented in accordance with a preferred embodiment. Note that in FIGS. 3-12, identical or similar parts or elements are generally indicated by identical reference numerals. The in-cylinder pressure sensor 200 can be mounted on the engine cylinder 100 in order to measure varying pressure inside the cylinder 100 in case of a compression ignition engine and a spark ignition engine. A spark plug or a fuel injector 160 as shown in FIG. 5 can be provided in the combustion chamber 190 in case of the spark ignition engine and the compression ignition engine respectively.

The spark plug 160 can be provided in the combustion chamber 190 to ignite a spark in accordance with an ignition timing signal from the data acquisition unit 400. The air-fuel is burned by the spark ignited by the spark plug 160. The in-cylinder pressure sensor 200 is embedded in a portion, contacting with the cylinder 100, of the spark plug 160. Alternatively, when the intake valve 130 is disposed in the combustion chamber 190, the in-cylinder pressure sensor 200 may be embedded in a portion, contacting with the engine cylinder 100, of the intake valve 130.

Similarly, the fuel injector 160 is commonly utilized in connection with the diesel internal combustion engines, which inject fuel into the combustion chamber 190 during engine operation. A fuel injector 160 can be disposed in the intake manifold 110 which injects fuel in accordance with a control signal from the data acquisition unit 400. Alternatively, the fuel injector 160 may be disposed in a combustion chamber 190. The engine cylinder 100 takes air-fuel mixture from the air taken from the intake manifold 110 and the fuel injected by the fuel injection valve into the combustion chamber 190. The in-cylinder pressure sensor 200 generates a signal indicating a change rate of the in-cylinder pressure within the combustion chamber 190. The signal is sent to the data acquisition system 400 by means of a shielded two pair cable 180.

Figure 6:
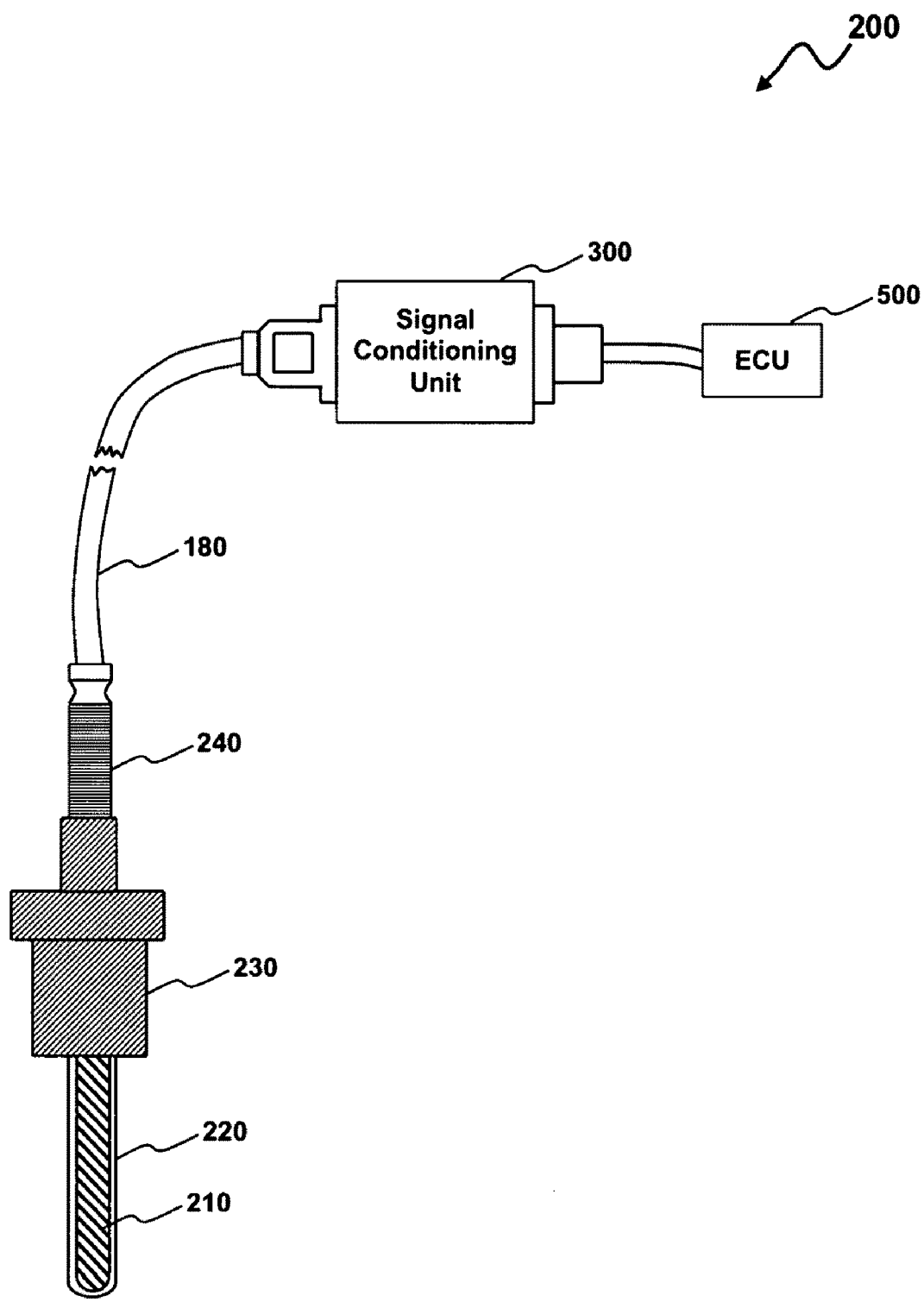
FIG. 6 illustrates a schematic view of the in-cylinder pressure sensor, which can be implemented in accordance with a preferred embodiment.

Referring to FIG. 6, a schematic view of the in-cylinder pressure sensor 200 is illustrated, which can be implemented in accordance with a preferred embodiment. The in-cylinder pressure sensor 200 includes a metallic probe 210 with a selective coating 220 in order to electrically insulate the probe 210 and work in harsh, corrosive and elevated temperature. The pressure sensor 200 can be placed in the engine cylinder 100 closer to spark plug or diesel injector 160 and can be tightened by the external mounting nut or thread housing and senses the pressure in the cylinder 100. The metallic probe 210 will expose inside the cylinder combustion chamber 190 for measuring the image charge of combustible product. The sensor 200 further includes a probe housing 230 that isolates the dynamic pressure sensor 200 from the temperature of the combustion chamber 190 and a cable holder 240 for mounting the shielded two pair cable 180. An external mounting nut or threaded housing can be used to mount the sensor 200 in the cylinder head.

The gases and particulates ionized during combustion due to chemi and or thermal ionization and the ionization charge can be measured in the engine cylinder 100 by the metallic probe 210 with the selective coating 220 and the parameters like in cylinder pressure and knocking can be estimated utilizing image charge technology. The in-cylinder pressure sensor 200 can be mounted along with the engine cylinder 100 and the data can be acquired utilizing the data acquisition system 400. Engine data acquisition system 400 utilizes the signals transmitted from the sensor 200 and the program stored in a memory 470 as a module 475. These cylinder pressure signals can be fed to engine control unit (ECU) 500 and ECU 500 can control the engine to a desired driving condition.

Figure 7:
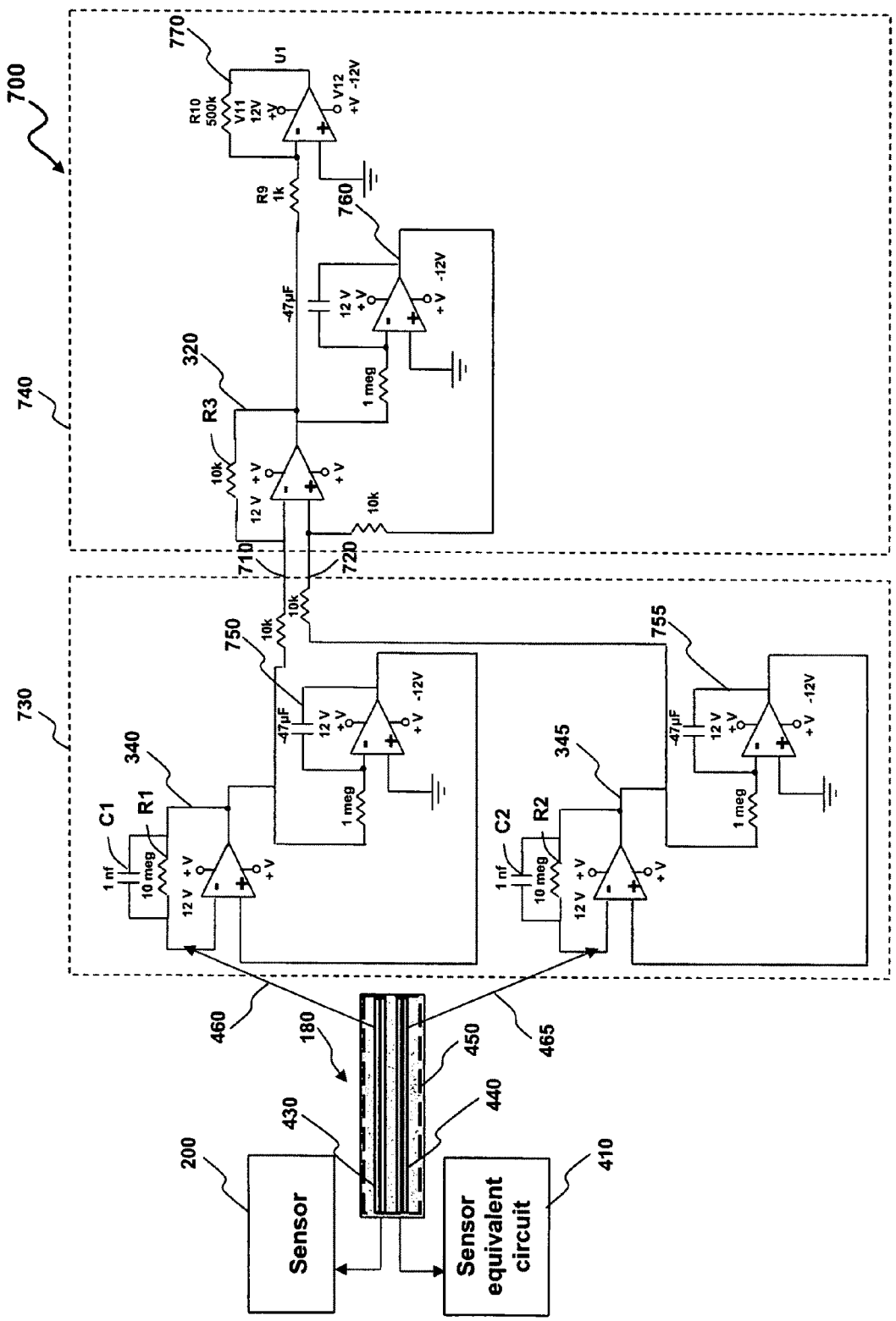
FIG. 7 illustrates a schematic representation of a low noise differential amplifier circuit in the signal conditioning unit, which can be implemented in accordance with a preferred embodiment.

Referring to FIG. 7 a schematic representation of a low noise differential amplifier circuit 700 of the signal conditioning unit is illustrated, which can be implemented in accordance with a preferred embodiment. Note that in FIGS. 3-12, identical or similar parts or elements are generally indicated by identical reference numerals. The differential amplifier circuit 700 includes a pair of input charge amplifiers 340 and 345 for receiving output signals 460 and 465 to be amplified from the wire pairs 430 and 440. The grounded shielding 450 provides a conductive enclosure for the cable 180 to insulate it from electromagnetic fields originating outside the shielding 450 and to limit signal leakage from the cable 180. A linear offset correction circuit 750, 755 and 760 can be provided with the charge amplifiers 340 and 345 and differential amplifier 320, which includes sources for correcting offset errors in the output signal 770 of the differential amplifier 320.

The offset correction circuits 750, 755 and 760 can be utilized to remove a fixed offset or a slowly varying offset. The output 460 and 465 from the wire pairs 430 and 440 can be applied to the first stage 730 of the low noise differential amplifier circuit 700. The charge amplifiers 340 and 345 includes feedback resistors R1, R2 and feedback capacitors C1, C2 connected between the outputs and the inverting inputs of the charge amplifiers 340 and 345. The charge amplifier 340 and 345 can be an operational amplifier having FET at the input stage with a power source of +12V (or any other suitable voltage like +5V, +10 V, +15V, based on the supply source like battery or mains) is connected to a positive power source input terminal of the operational amplifier whereas a power source of −12V (or any other suitable voltage like 0V, −5V, −10V, −15V, based on the supply source like battery or mains) is connected to a negative power source input terminal of the operational amplifier as illustrated in FIG. 7.

The outputs 710 and 720 of charge amplifiers 340 and 345 can be connected to the inverting and non-inverting inputs of the differential amplifier 320 in the second stage 740. The differential amplifier 320 can be differential, and it produces an output signal which corresponds to the differential in the outputs 710 and 720 of the two charge amplifiers 340 and 345. The grounding of the shield 450 usually improves circuit operation. Metallic grounded shields placed around equipment effectively prevent noise from either entering or leaving the system.

The differential amplifier 320 subtracts the signals from the charge amplifiers 340 and 345 hence common mode noise picked up by the cable 180 gets reduced drastically. The low noise differential amplifier circuit 700 with the untwisted and or twisted two pair cable 180 and grounded shield 450 disclosed herein can therefore reduce common mode noise signal picked up by the cable 405. The noise reduction technique is suitable for ultra low charge, current and voltage measurement in noisy, elevated temperature and corrosive environment utilizing high gain charge, current and voltage amplifier respectively. The amplified charge signal from the signal conditioning unit 300 can be directed to the data acquisition system 400 in order to analyze and estimate in-cylinder parameters.

Figure 8:
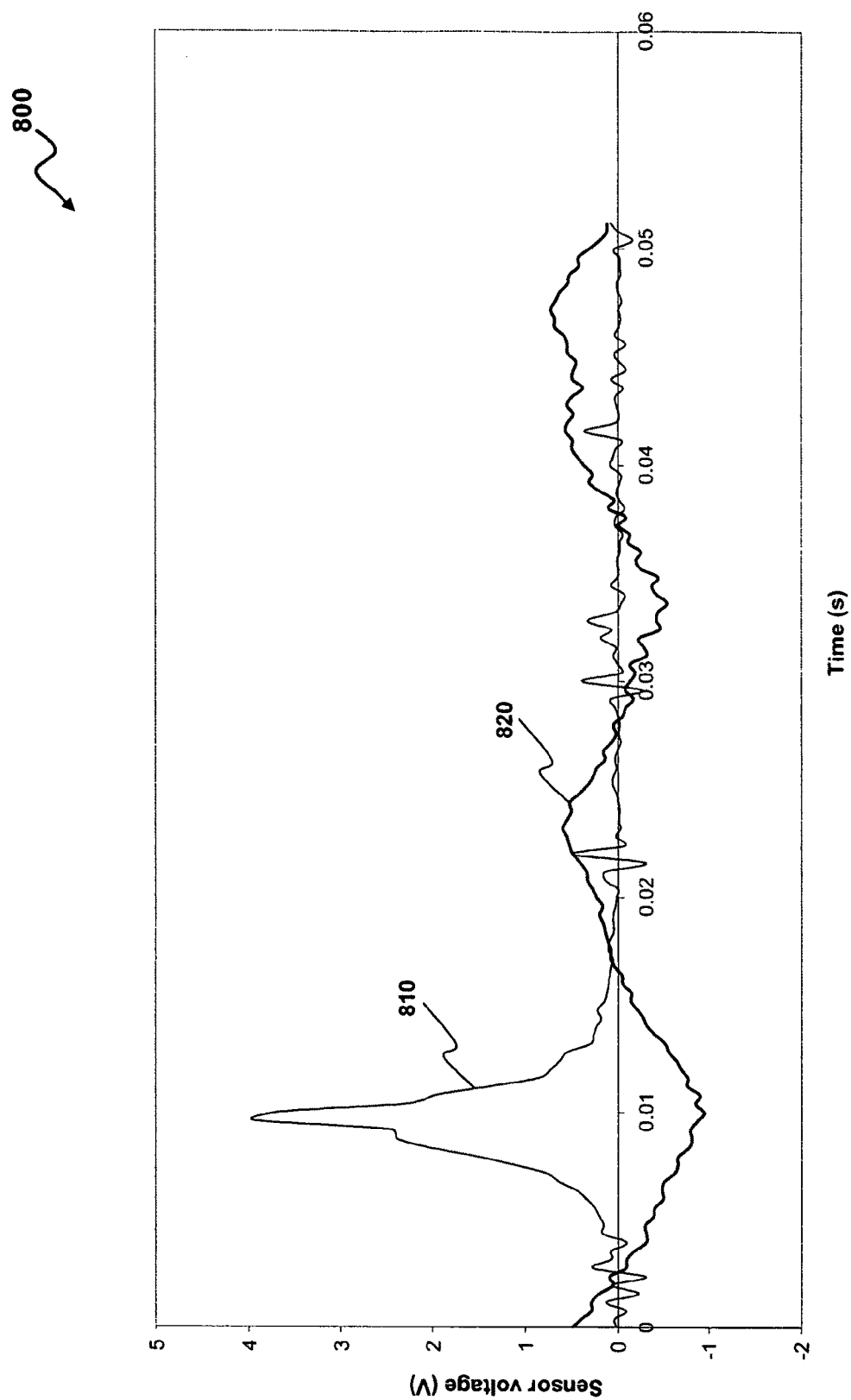
FIG. 8 illustrates a graph depicting the in-cylinder pressure sensor raw output signal versus a reference piezoelectric pressure sensor output signal for a normal engine, in accordance with a preferred embodiment.
Figure 9:
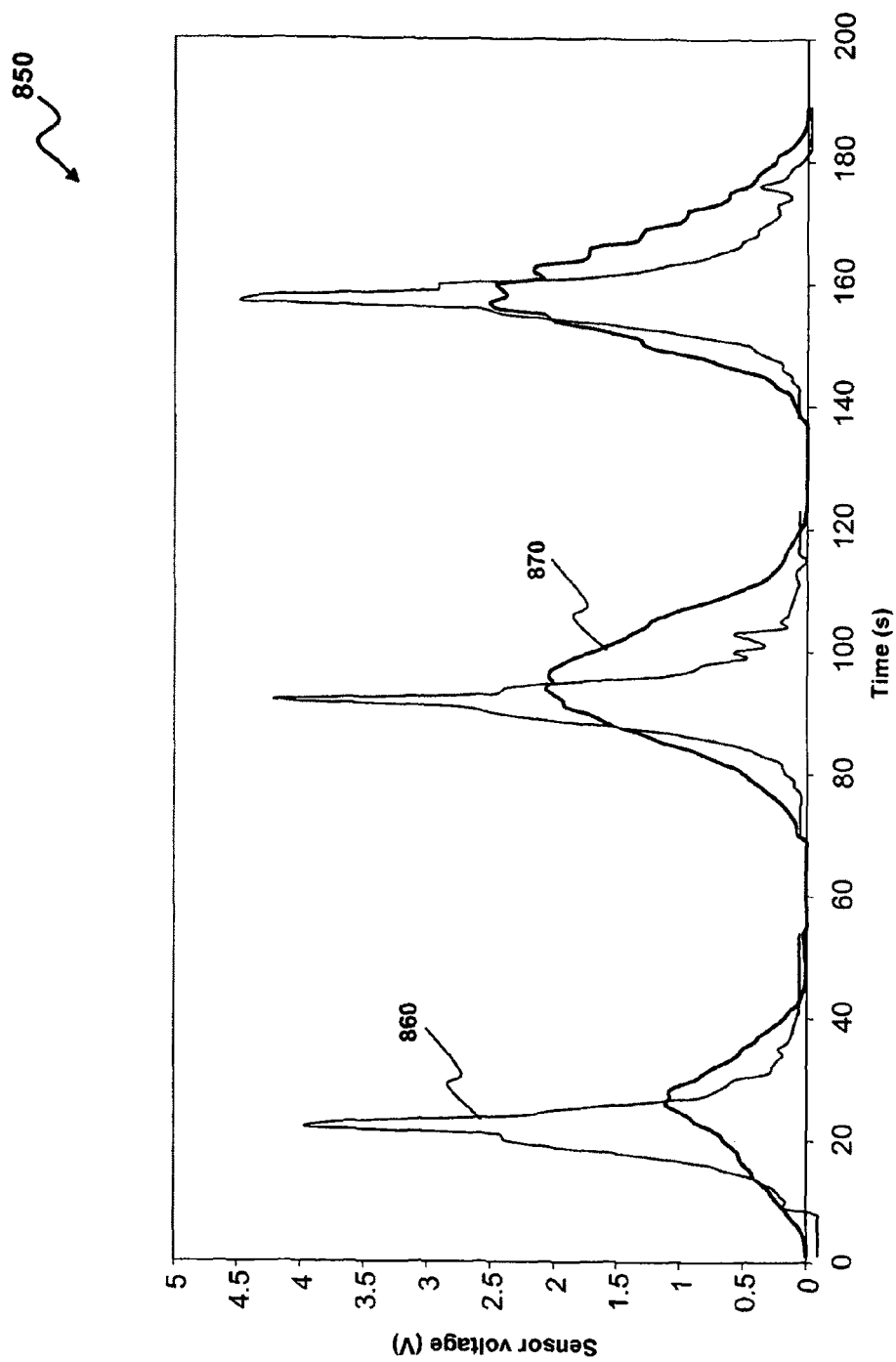
FIG. 9 illustrates a graph depicting the in-cylinder pressure sensor processed output signal versus a reference piezoelectric pressure sensor output signal for the normal engine processed at different load conditions, in accordance with a preferred embodiment.

Referring to FIG. 8 a graph 800 depicting the in-cylinder pressure sensor output signal versus a reference piezoelectric pressure sensor output signal for a normal engine is illustrated, in accordance with a preferred embodiment. FIG. 8 illustrates an output of the internal cylinder pressure sensor 200, that is, a rate of change of the in-cylinder pressure sensor voltage 820 and the reference piezoelectric pressure sensor voltage 810. The data collected and analyzed from the data acquisition system 400 shows good co-relation to in cylinder pressure and thermal and or Chemi ionization effect can be observed. Referring to FIG. 9 a graph 850 depicting the in-cylinder pressure sensor output signal versus a reference piezoelectric pressure sensor signal for the normal engine processed at different load conditions is illustrated, in accordance with a preferred embodiment. The graph depicts the sensor output signal 870 utilizing in-cylinder pressure sensor 200 based on image charge technique processed at different load conditions shows good correlation with the reference piezoelectric pressure sensor output signal 860.

Figure 10:
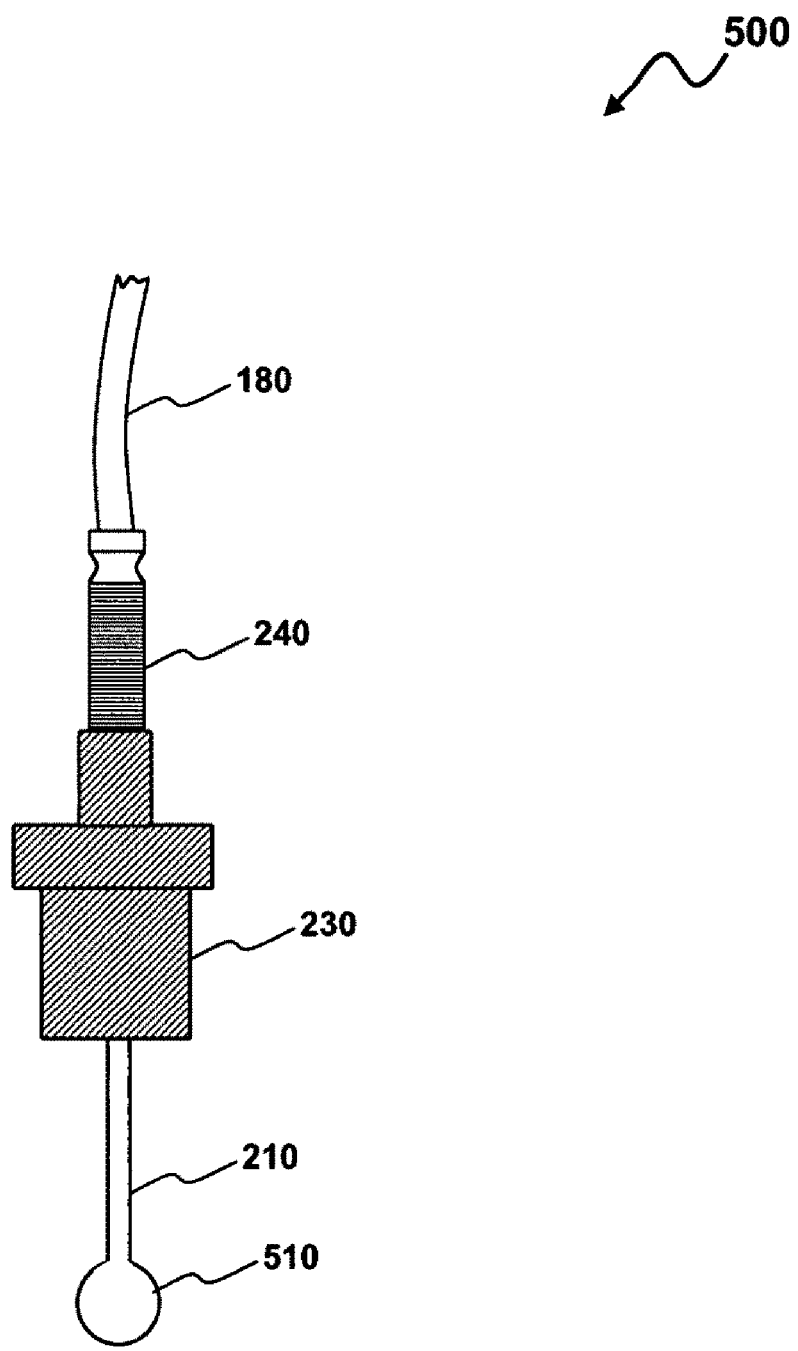
FIG. 10 illustrates a perspective view of the in-cylinder pressure sensor, which can be implemented in accordance with an alternative embodiment.

Referring to FIG. 10 a perspective view of the in-cylinder pressure sensor 500 is illustrated, which can be implemented in accordance with an alternative embodiment. Note that in FIGS. 3-12, identical or similar parts or elements are generally indicated by identical reference numerals. The surface area of the metallic probe 210 can be increased by adding a ball shaped probe 510 with or without the selective coating 220.

Figure 11:
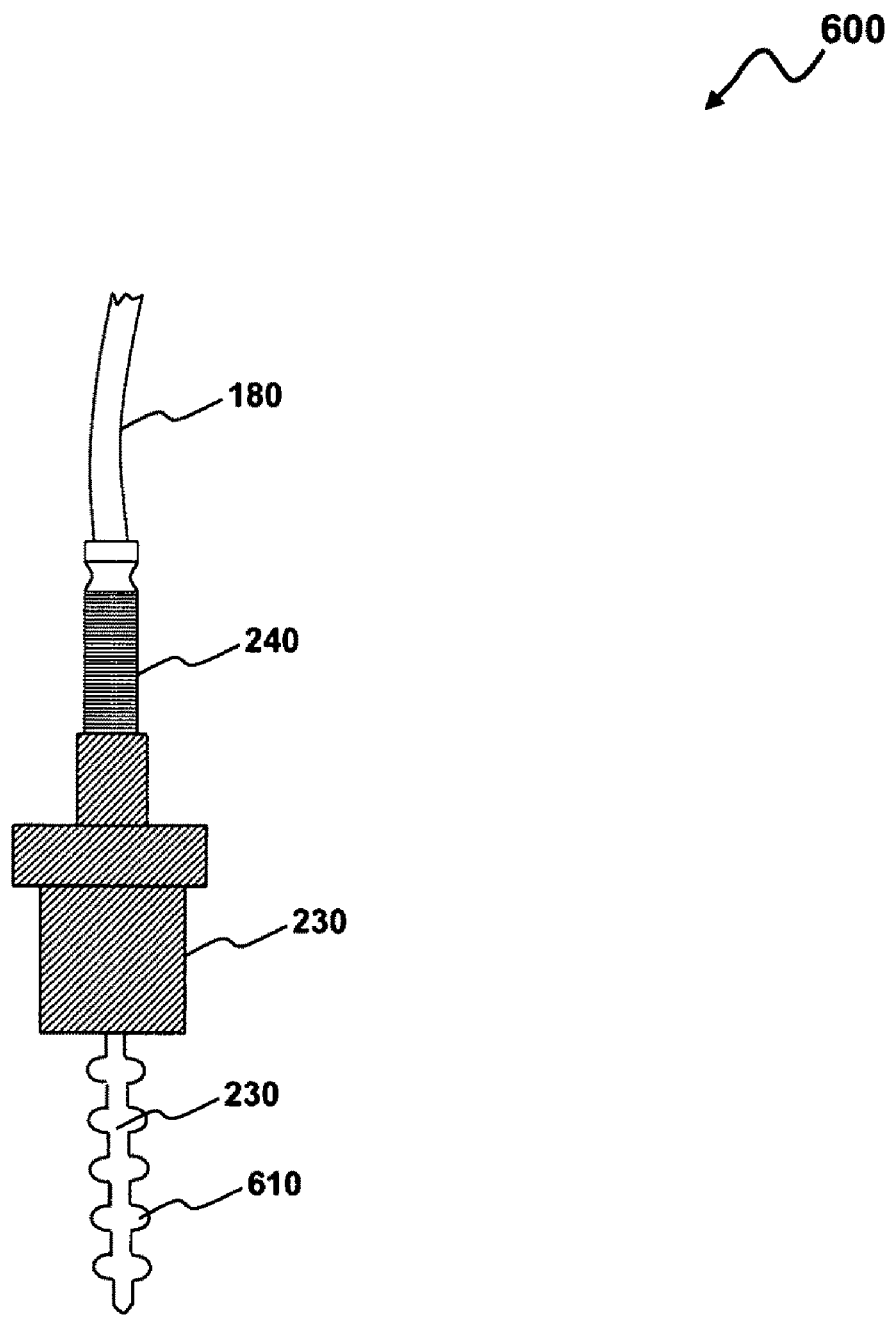
FIG. 11 illustrates a perspective view of the in-cylinder pressure sensor, which can be implemented in accordance with an alternative embodiment.

Referring to FIG. 11 a perspective view of the in-cylinder pressure sensor 600 is illustrated, which can be implemented in accordance with an alternative embodiment. The surface area of the metallic probe 210 can also be increased by adding fins 610 with or without the selective coating 220 as shown in FIG. 11.

Figure 12:
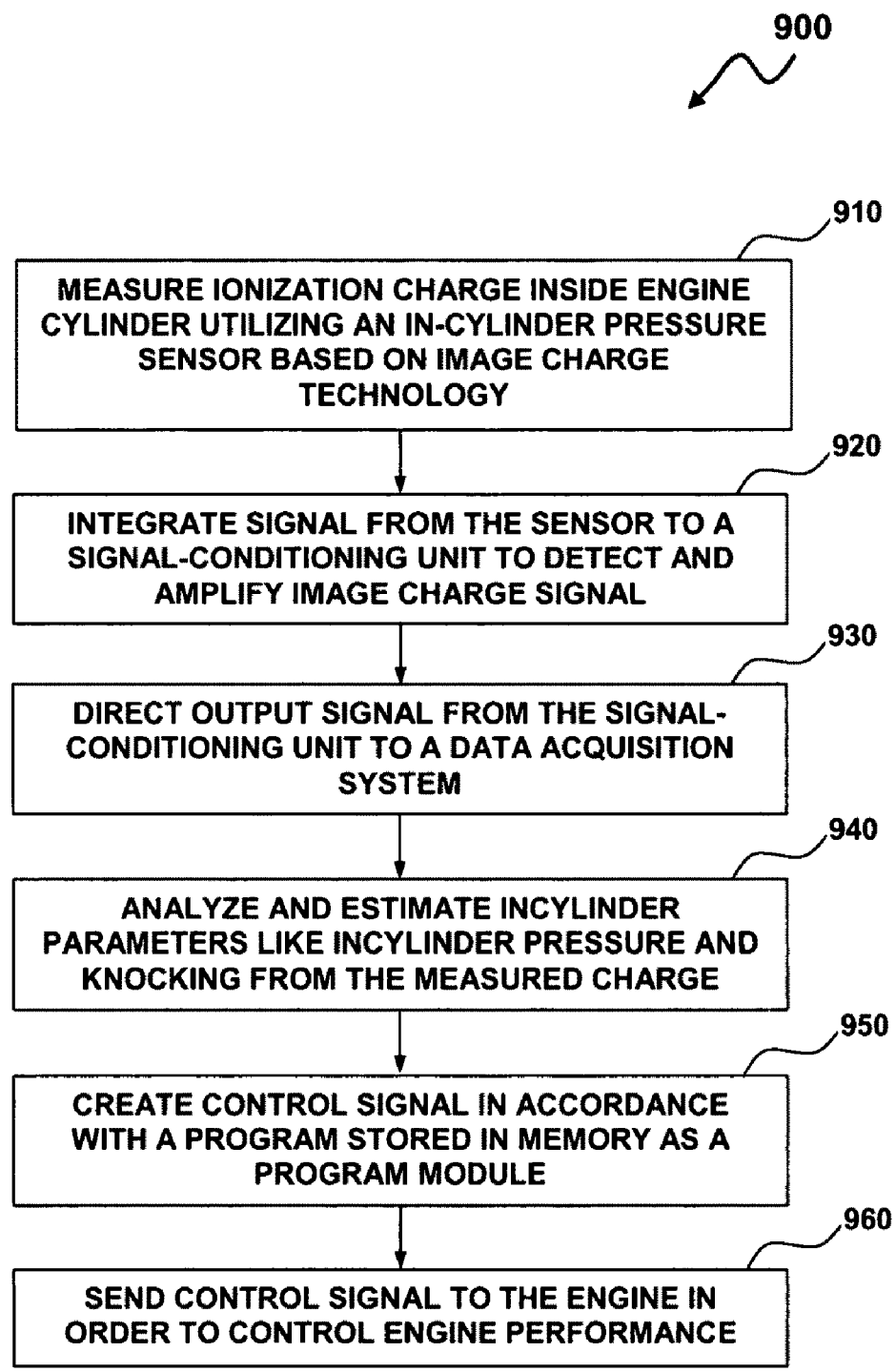
FIG. 12 illustrates a detailed flow chart of operations illustrating logical operational steps of a method for estimating in-cylinder parameters, in accordance with an alternative embodiment.

Referring to FIG. 12 a detailed flow chart of operations illustrating logical operational steps of a method 900 for estimating in-cylinder parameters is illustrated, in accordance with an alternative embodiment. Note that the method 900 depicted in FIG. 12 can be implemented in the context of a software module such as, for example, the module 475 of data acquisition system 400 depicted in FIG. 1. The ionized charge due to chemi and or thermal ionization inside engine cylinder 100 can be measured utilizing an in-cylinder pressure sensor 200 based on image charge technology, as depicted at block 910. Thereafter, as indicated at block 920, signals from the in-cylinder pressure sensor 200 can be integrated to a signal-conditioning unit 300 in order to detect and amplify image charge signal. The output signal from the signal-conditioning unit can be directed to a data acquisition system 400, as shown at block 930.

Next, as described at block 940, the in-cylinder parameters like in-cylinder pressure and knocking can be analyzed and estimated from the measured charge. The control signal can be created in accordance with a program stored in memory 470 as a program module 475, as depicted at block 950. The control signal can be sent to the engine cylinder 100 in order to control engine performance, as shown at block 960.

The image charge technique utilizes charge amplifiers 340 and 345 in order to measure ions (charge) generated in the cylinder 100 during combustion, which is function of pressure and knocking. The sensor probe 210 includes simple metal electrodes coated with suitable material (metal, oxides of metal, native oxides, semiconductor, oxides of semiconductors, ceramics, glass, dielectric, etc in form of coating on the metallic probe, tube, etc) that can with stand and work in harsh, corrosive and elevated temperature. The system 50 comprises a software module 475 in the data acquisition system 400, which is used to estimate the values of the parameters from the raw signal hence the hardware is simple and low cost. The sensor 200 can be made utilizing simple spark plug design. Hence the cost of the sensor is very low and is suitable for high volume production.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for estimating in-cylinder parameters in an engine cylinder, comprising;
    an in-cylinder pressure sensor associated with an engine cylinder for sensing an ionization charge inside said engine cylinder and outputting an image charge signal indicative of a change rate of said engine cylinder pressure;
    a signal conditioning unit in communication with said in-cylinder pressure sensor including a pair of charge amplifier and a differential amplifier for detecting and amplifying said image charge signal; and
    a data acquisition component for estimating at least one in-cylinder parameter and creating a control signal in accordance with a program stored in a memory as control logic in order to control said engine cylinder performance.

2. The system of claim 1 further comprising;
    a metallic sensor probe with a selective coating associated with said in-cylinder pressure sensor in order to electrically insulate said metallic sensor probe and to function in a harsh, corrosive and elevated temperature environment.

3. The system of claim 1 wherein said pair of charge amplifier and said differential amplifier comprises an auto offset correction circuit, which substantially reduces error due to offsets.

4. The system of claim 1 wherein said at least one in-cylinder parameter comprises of an in-cylinder pressure and knocking.

5. The system of claim 1 wherein said signal conditioning unit comprises a twisted two pair cable with grounded shield in order to reduce a common mode noise signal.

6. The system of claim 1 wherein said control logic comprises a module stored in said memory and executed by said data acquisition system.

7. A system for estimating in-cylinder parameters in an engine cylinder, comprising;
    an in-cylinder pressure sensor associated with an engine cylinder for sensing an ionization charge inside said engine cylinder and outputting an image charge signal indicative of a change rate of said engine cylinder pressure;
    a signal conditioning unit in communication with said in-cylinder pressure sensor including a pair of charge amplifier and a differential amplifier for detecting and amplifying said image charge signal;
    a data acquisition component for estimating at least one in-cylinder parameter and creating a control signal in accordance with a program stored in a memory as a control logic in order to control said engine cylinder performance; and
    a metallic sensor probe with a selective coating associated with said in-cylinder pressure sensor in order to function within a harsh, corrosive and elevated temperature environment.

8. The system of claim 7 wherein said pair of charge amplifier and said differential amplifier comprises an auto offset correction circuit, which substantially reduces error due to offsets.

9. The system of claim 7 wherein said at least one in-cylinder parameter comprises of an in-cylinder pressure and knocking.

10. The system of claim 7 wherein said signal conditioning unit comprises a twisted two pair cable with grounded shield in order to reduce a common mode noise signal.

11. The system of claim 7 wherein said control logic comprises a module stored in said memory and executed by said data acquisition system.

12. The system of claim 7 wherein:
    said pair of charge amplifier and said differential amplifier comprises an auto offset correction circuit, which substantially reduces error due to offsets; and
    said at least one in-cylinder parameter comprises of an in-cylinder pressure and knocking.

13. The system of claim 7 wherein:
    said signal conditioning unit comprises a twisted two pair cable with grounded shield in order to reduce a common mode noise signal; and
    said control logic comprises a module stored in said memory and executed by said data acquisition system.

14. The system of claim 7 wherein:
    said pair of charge amplifier and said differential amplifier comprises an auto offset correction circuit, which substantially reduces error due to offsets;
    said at least one in-cylinder parameter comprises of an in-cylinder pressure and knocking,
    said signal conditioning unit comprises a twisted two pair cable with grounded shield in order to reduce a common mode noise signal; and
    said control logic comprises a module stored in said memory and executed by said data acquisition system.

15. A method for estimating in-cylinder parameters in an engine cylinder, comprising;
    associating an in-cylinder pressure sensor with an engine cylinder for sensing an ionization charge within said engine cylinder and outputting an image charge signal indicative of a change rate of said engine cylinder pressure;
    configuring a signal conditioning unit in communication with said in-cylinder pressure sensor including a pair of charge amplifier and a differential amplifier for detecting and amplifying said image charge signal; and
    providing a data acquisition component for estimating at least one in-cylinder parameter and creating a control signal in accordance with a program stored in a memory as control logic in order to control said engine cylinder performance.

16. The method of claim 15 further comprising;
    coating a metallic sensor probe with a selective coating associated with said in-cylinder pressure sensor in order to electrically insulate said metallic sensor probe and to function in a harsh, corrosive and elevated temperature environment.

17. The method of claim 15 wherein said pair of charge amplifier and said differential amplifier comprises an auto offset correction circuit, which substantially reduces error due to offsets.

18. The method of claim 15 wherein said at least one in-cylinder parameter comprises of an in-cylinder pressure and knocking.

19. The method of claim 15 wherein said signal conditioning unit comprises a twisted two pair cable with grounded shield in order to reduce a common mode noise signal.

20. The method of claim 15 wherein said control logic comprises a module stored in said memory and executed by said data acquisition system.

* * * * *